United States Patent [19]

De Dompierre

[11] Patent Number: 5,217,423

[45] Date of Patent: Jun. 8, 1993

[54] METHOD FOR THE PREPARATION OF BLANK SEPARATING TOOLS

[75] Inventor: Jean-Bernard De Dompierre, Echandens, Switzerland

[73] Assignee: Bobst SA, Switzerland

[21] Appl. No.: 946,600

[22] Filed: Sep. 18, 1992

Related U.S. Application Data

[62] Division of Ser. No. 691,961, Apr. 26, 1991.

[30] Foreign Application Priority Data

Apr. 26, 1990 [CH] Switzerland .................. 01418/90

[51] Int. Cl.⁵ .................................... B23Q 3/155
[52] U.S. Cl. ......................................... 483/1
[58] Field of Search .................... 483/1, 14, 15, 16, 28, 483/29, 69; 83/136, 167, 519, 541, 563; 100/299, 918; 72/446, 404, 446, 413

[56] References Cited

U.S. PATENT DOCUMENTS

| | | | |
|---|---|---|---|
| 2,413,999 | 1/1947 | Shaner | 83/167 |
| 4,175,686 | 11/1979 | Lang | 225/97 |
| 4,646,600 | 3/1987 | Flick et al. | 83/136 |
| 4,682,401 | 7/1987 | Tadashi et al. | 483/29 X |
| 4,706,532 | 11/1987 | Hashimoto | 83/563 |
| 4,718,161 | 1/1988 | Pfister et al. | 483/28 |
| 4,741,092 | 5/1988 | Labarre | 483/28 |

FOREIGN PATENT DOCUMENTS

| | | | |
|---|---|---|---|
| 3331667 | 3/1985 | Fed. Rep. of Germany | 83/563 |
| 947250 | 1/1964 | United Kingdom | 83/563 |

*Primary Examiner*—William Briggs
*Attorney, Agent, or Firm*—Hill, Steadman & Simpson

[57] ABSTRACT

A table, which is used for holding upper and lower tools of a blank separating station which separates blanks formed in a sheet into separate units includes a frame having an assembly on one side for holding one pair of upper and lower tools and an assembly on the opposite side for holding a second pair of tools, said frame being mounted for rotation around the horizontal axis so as to present one set of tools in a position for being inserted into a machine and to allow operating and positioning a punch on the other set of tools by passing the punch through openings in the lower tool of said pair to be placed on a surface of the upper tool facing the lower tool.

3 Claims, 6 Drawing Sheets

METHOD FOR THE PREPARATION OF BLANK SEPARATING TOOLS

This is a division, of application Ser. No. 07/691,961, filed Apr. 26, 1991.

BACKGROUND OF THE INVENTION

The present invention is directed to a device for handling tools used to separate blanks in a machine processing plate or sheet-shaped workpieces for producing blanks for forming packages.

In order to form a package three successive phases must be accomplished. These are:
  Printing numerous motifs or images on a sheet of material with each motif or series of images representing a single package;
  Cutting the sheet into several blanks, each of which is printed with the motif; and
  Folding and gluing every blank with a view to form the flat folded package.

The sheet after having undergone the cutting action is transferred as a rule by means of gripper bars which are mounted on a pair of chains to a subsequent waste stripping station wherein waste which consist of the portions of the sheet area situated between every blank and which is to be excluded from the package is removed. After passing through the stripping station, the sheet with the waste removed is sent to a delivery station with all the blanks of the same sheet remaining attached together by means of linking points which correspond to very small non-cutting nicks, which were made in the cutting rules of the press which perform the cutting.

In the delivery station, and depending on the requirements, it should be possible to either form a pile of the sheets with all of the blanks in each sheet still being attached to one another by means of their linking points or to simultaneously form several piles of blanks which have been separated from one another due to the breakage of the linking points which occurs in a previous station called a blank separating station.

In a blank separating station, it is the current practice to use an upper movable and a lower fixed tool. The upper tool consist of an assembly of punches and the lower tool is a matrix with apertures. The upper movable punches will force the blank through the apertures in the lower matrix which causes the breakage of the various linkage points either between each blank or between the margin of the blank and the peripheral waste of the sheet. The separating tools will thus have to be adapted to the shape and the arrangement of the blanks on each new run of sheets which are being processed. Generally the punches are positioned according to the cutting lines of the press on a basic plate fitted on an upper movable tool carrier frame and the blank separating station. A corresponding aperture or mesh of the over matrix is made up of little bars and are situated underneath and aligned with every punch. The little bars are arranged so as to overstep one another to form a grid or matrix of which the meshes have approximately the same dimensions as the blanks which are to be separated.

In order to avoid manufacturing new blanks separating tools for every new run, it has been suggested in U.S. Pat. No. 4,175,686, whose disclosures incorporated by reference thereto and which claims priority from the same Swiss application that matured as Swiss Patent No. 617886, to fit the punches to be horizontally shifted along bars mounted on a vertically movable frame. In addition, the lower matrix consist of crossed bars which are shiftable in such a way as to form a grid of which the meshes or size of the openings have adjustable dimensions. For its preparation the lower tool is placed flat upon a table covered with a sheet having an imprint representing the blanks on the sheet. Then, the bars are positioned with reference to the imprint. The preparation of the upper tool is more or less similar with the difference that not only are the bars being positioned but also the punches are shifted along the bars with regard to the imprint. However, when the upper tool has the shape of a plate with air outlet openings and the punches are mounted on the lower surface of the plate in a removable way, the abovementioned procedure will not be usable. In fact, it is difficult to perceive the imprint through the plate openings, yet the use of such a plate is increasing.

In addition to reduce the machine production stops to a maximum amount, it is current practice to prepare on a first table the upper and lower tools for a subsequent run. At the instances of a required tool exchange, the operating tools are slid out of the machine on to a second table which is positioned adjacent the machine. Then the second table is moved and the first table is positioned in the previous position of the second table so as to allow the new tools to be slid inside the machine. The substitution of one table by another is troublesome and increases the down time necessary for changing the tools. In addition, the two tables which are needed increase the amount of space necessary in the general vicinity of the machine.

SUMMARY OF THE INVENTION

The present invention is directed to providing a design for a device which eliminates the above mentioned drawbacks with the previous existing exchanges of tools.

To accomplish these goals the present invention is directed to a table for the preparation of a pair of universal blank separating tools used in a machine for separating package blanks which have been cut in a sheet or a web of material, said blank separating tools including a movable upper tool for pushing the blanks through corresponding apertures of a lower tool, said table comprising a first assembly of supports for a first pair of tools and a second assembly of supports for a second pair of tools, the two tools of the same pair being arranged one with regard to the other in a way similar to the disposition of these tools in the machine, said table being shiftable between a first position in which the first assembly of supports are positioned to enable horizontal transfer between the table and machine to a second position in which the operator is able to insert punches of the upper tool through the apertures of the lower tool which has been previously prepared and serves as a reference for setting the punches of the upper tool of said pair. Preferably, the table includes a rectangular frame which is pivotally mounted for movement around the horizontal axis so that the supports of one pair tools overlie the supports for the second pair of tools and these positions can be reversed.

Additional advantages and features of the present invention will be readily apparent for filing the description of the preferred embodiments, the drawings and claims.

DESCRIPTION OF THE PREFERRED EMBODIMENTS

Figure 1:
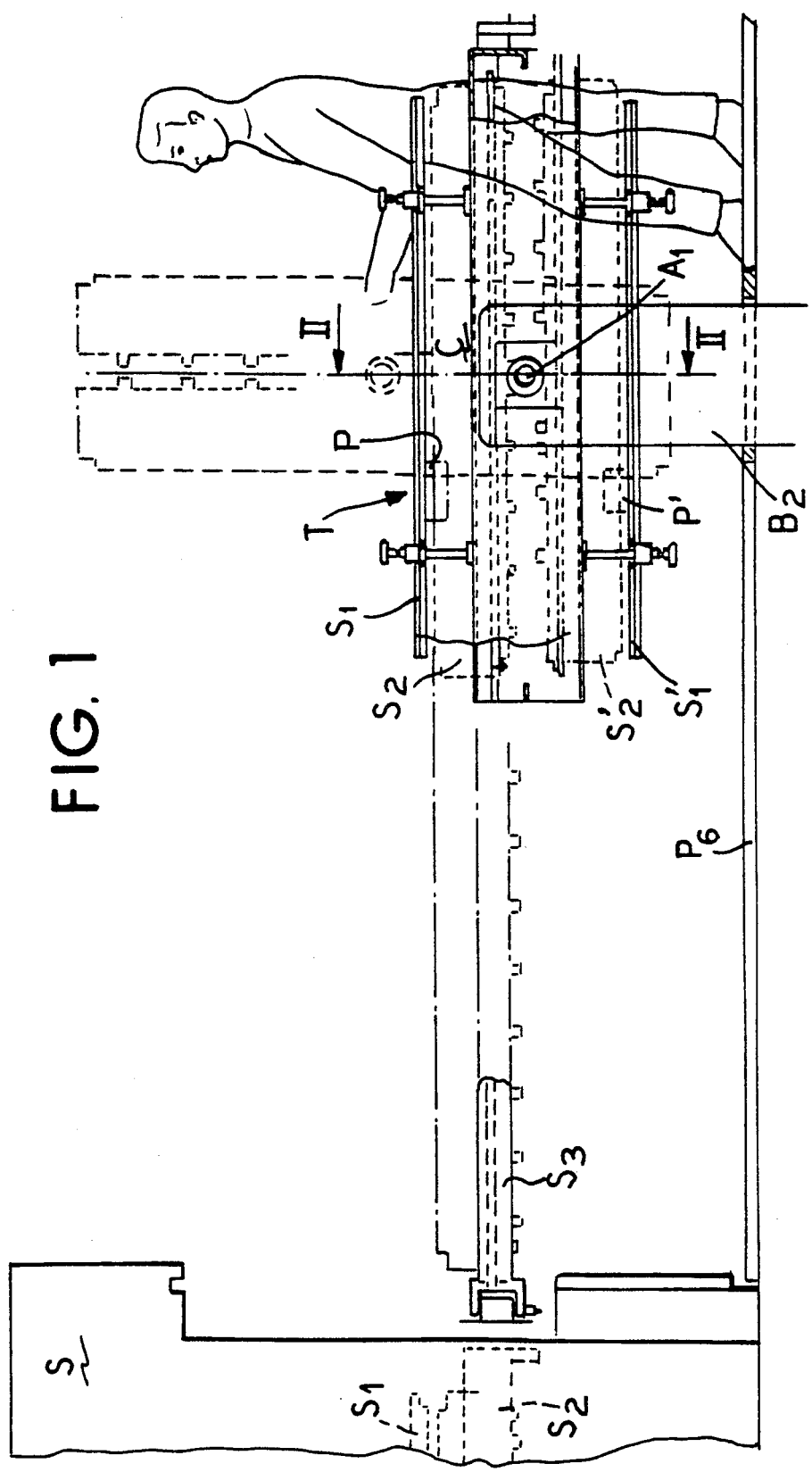
FIG. 1 is a side elevational view of the table in accordance with the present invention positioned for installing the blank separating tools into a blank separating station.

The principles of the present invention are particularly useful when incorporated in a preparation table generally indicated at T and FIG. 1. As illustrated in FIG. 1 a blank separation station S is positioned subsequent to the waste stripping station of a cutting machine. The station S supports shapes as guides which are designed to carry a pair of separating tools which includes an upper separating tool S1 and a lower separating tool S2 which are shown in dash lines. For the fitting and dismantling of the tools S1 and S2, they may slide along a horizontal plane into and out of the station S. For an easy mounting and dismantling of the lower tool S2, which is a relatively heavy tool, the station is provided with a outer retractable guide S3.

The preparation table T is constructed to carry two pairs of tools S1, S2 and S'1 and S'2 respectively and is located in front of the station S. The table 2 is able to pivot around horizontal axis A1 and is mounted on two vertical supports B1, B2 (see FIG. 2) which protrude or extend above a platform P6 (see FIG. 1) which is designed to provide support for the operator to walk upon. The axle A1 is perpendicular to the direction in which the tools S1, S2 are moved when being removed or inserted into the machine S.

Figure 2:
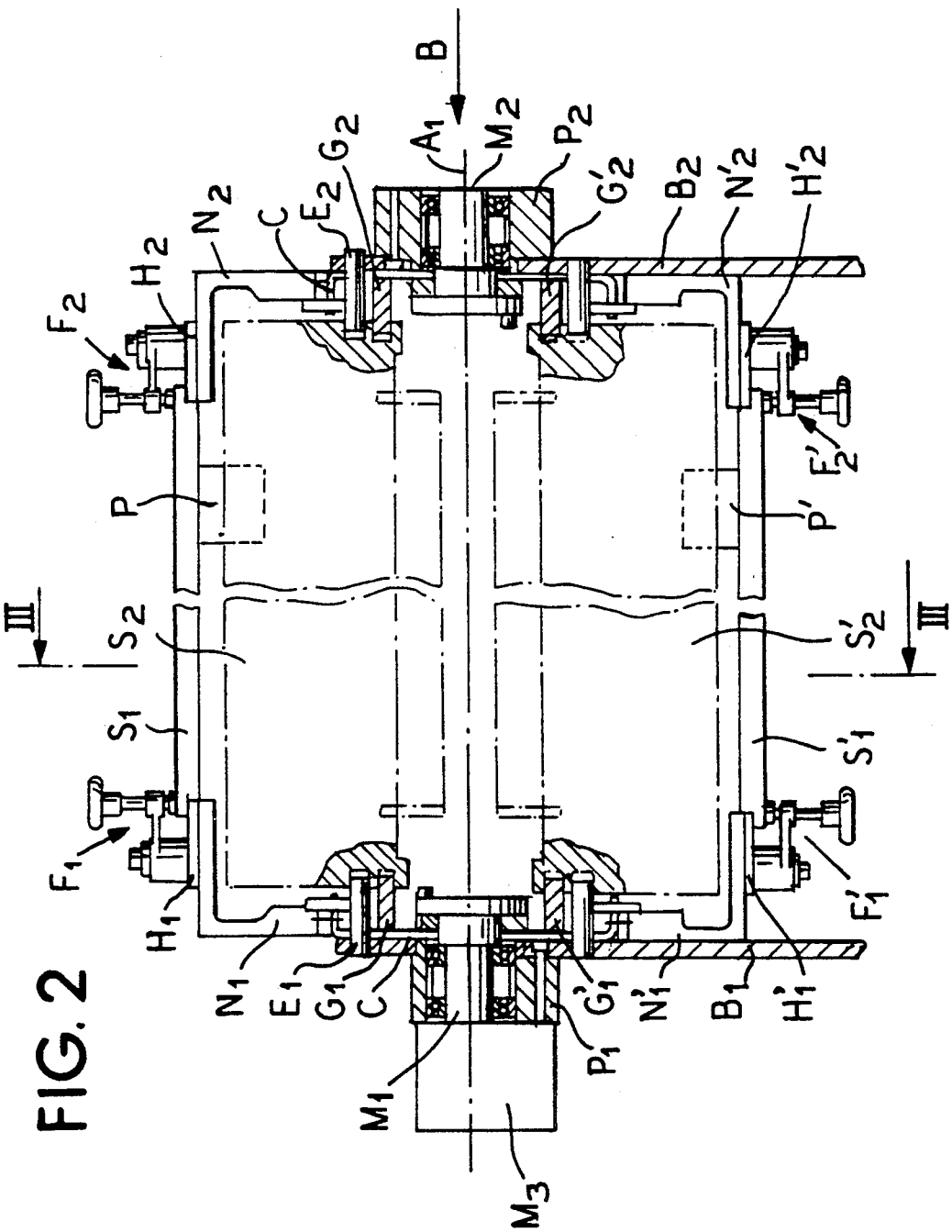
FIG. 2 is a cross sectional view taken along the line A—A of FIG. 1.
Figure 3:
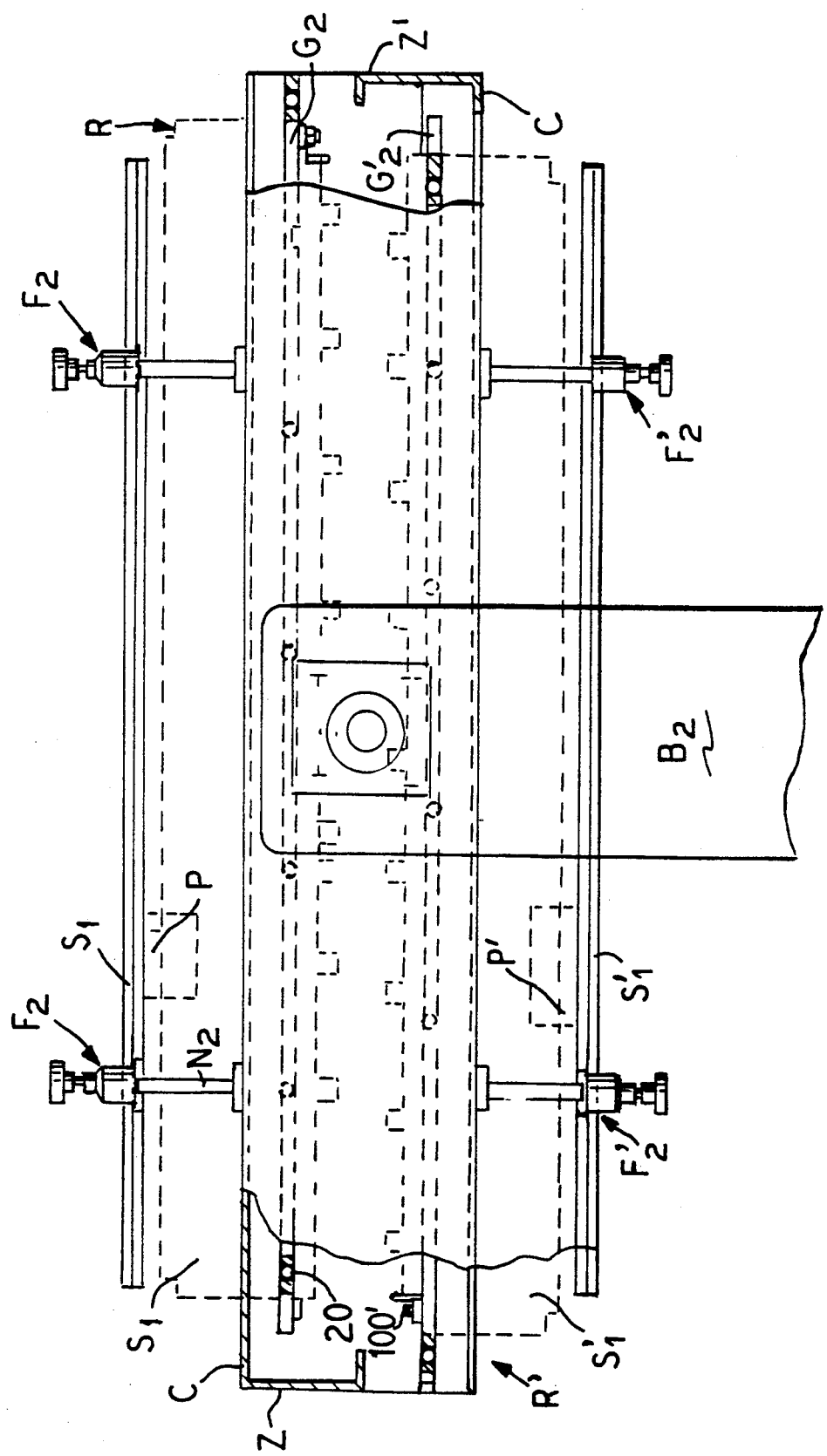
FIG. 3 is a side view taken in the direction of arrow B in FIG. 2 with partial cross sectional views taken along the line C—C of FIG. 2.

The table T as illustrated in FIGS. 2 and 3 includes a horizontal rectangular frame C. Two short hubs M1 and M2, which form the pivoting axis A1 of the frame C, are mounted in the middle of the two opposed sides of the frame C. The hubs M1 and M2 are mounted so as to rotate freely in ball bearings P1 and P2 in the upper end of each of the vertical frame members B1 and B2. Since the hub M1 is connected to the output of a motor M3, the table T will thus pivot around an axis A1.

Two horizontal guiding rails G1 and G2 are mounted on both sides of the frame C and extend perpendicular to the axis A1 which is defined by the hubs M1 and M2. The rails G1 and G2 form a sliding guide for receiving a lower tool S2 which is illustrated as a groove for receiving the guides. Two shiftable pins E1 and E2 are arranged adjacent the guides G1 and G2 to be engaged in corresponding apertures or holes of the tool S2 to lock the tool in a selected position.

Two vertical stays N1 and N2 are mounted on an upper edge of each of the sides of the frame C and extend upward above the guides G1 and G2 respectively. On the upper end of each pair of stays N1 and N2 are horizontal supports H1, H2 respectively which provide a mount for an upper tool S1. The arrangement is such that the disposition of the upper tool S1 with regard to the lower tool S2 is similar to the one that they will have when used in the machine.

The table T is also designed for carrying a second pair of upper and lower tools S'1 and S'2 of which the respective sides are parallel to and in opposite direction with the corresponding ones of the first pair S1 and S2. As illustrated in FIG. 2, table T has a second lower part which is identical to the first part described hereinabove and symmetrical to the axis A1. As illustrated, the second pair include two horizontal guides G'1 and G'2 with the shiftable locking pins E'1 and E2 as well as two pairs of vertical stays N'1 and N'2.

Thus, when the frame C is in horizontal position, the tools S1 and S2 of the upper pair are oriented in a position which corresponds to their operating position in which the blank separating punch P (only one being illustrated), which is mounted on a surface of the upper tool facing the lower tool, will extend downward through and between the bars of the lower tool S2. On the other hand, the punch P' of the upper tool S'1 of the lower pair of tools extends upward. As shown in FIG. 3, the table T has two upper and lower symmetrical parts which are slightly different by the fact that the frame C has an aperture or opening R situated on the right hand side for the passage of the lower tool S2 of the upper pair and an aperture R' situated on the left hand side for the lower tool S'2 of the lower pair. Thus, as illustrated in FIG. 3, the frame C has a stop Z on the left hand side to prevent removal of the tool S1 in the direction towards the left and the frame has a stop Z' on the right hand side to prevent movement of the tool S'1 out of the right end of the tool. To facilitate the shifting of both of the lower tools S2 and S'2, each of the guides G1, G'1, G2 and G'2 are provided with balls 20.

The table T is used in the following manner. In the course of production only the lower pair of tools S'1 and S'2 for instance is on the table T. The other pair S1 and S2 are in the machine S. In order to prepare the tools S'1 and S'2 for a new run, the frame C is turned through a 180° so as to bring the tool S'1 and S'2 to an upper position. Then the upper tool S'1 is removed and this makes it possible to prepare in a current way the lower tool S'2. When the tool S'2 is ready, the upper tool S'1 without the punches P' is then placed on the bar H'1 and H'2. Then the frame is turned 180° which will allow positioning the punches P' on the tool S'1 by introducing each punch P' from the top through the apertures of the lower tool S'2 in order to place them on the upper tool S'1 which is then in a position inverse with regard to the one of its real use in the machine. In this position, it is thus easy to position the punches P' with regard to the bars of the lower tool S'2 which bars are in the inverse position. The new pair of tools S'1 and S'2 is then ready to be transferred into the machine.

To accomplish a transfer, the table is leveled by means of the supports B1 and B2 which are vertically shiftable to a height of the outlet of the lower tool S2 operating in the machine. The lower tool S2 is then slid horizontally out of the machine and placed in the table. This is accomplished by the lower tool S2 extending into the frame C through the aperture R and being guided by the guide G1 and G2. The frame C is then turned to 180° so that the new tool S'1 and S'2 may slide into the machine, with the lower tool S'2 leaving the frame C through the aperture R1. It should be noted, that in most instances, the upper tool S1 will be removed with the lower tool S2 so that the tools are removed as a pair.

It is then possible to start the machine production utilizing the new tool pair S'1 and S'2. While this is occurring, the just removed tools S1 and S2 can be prepared to a new pattern or arrangement for the next operating run that is to follow.

Figure 4:
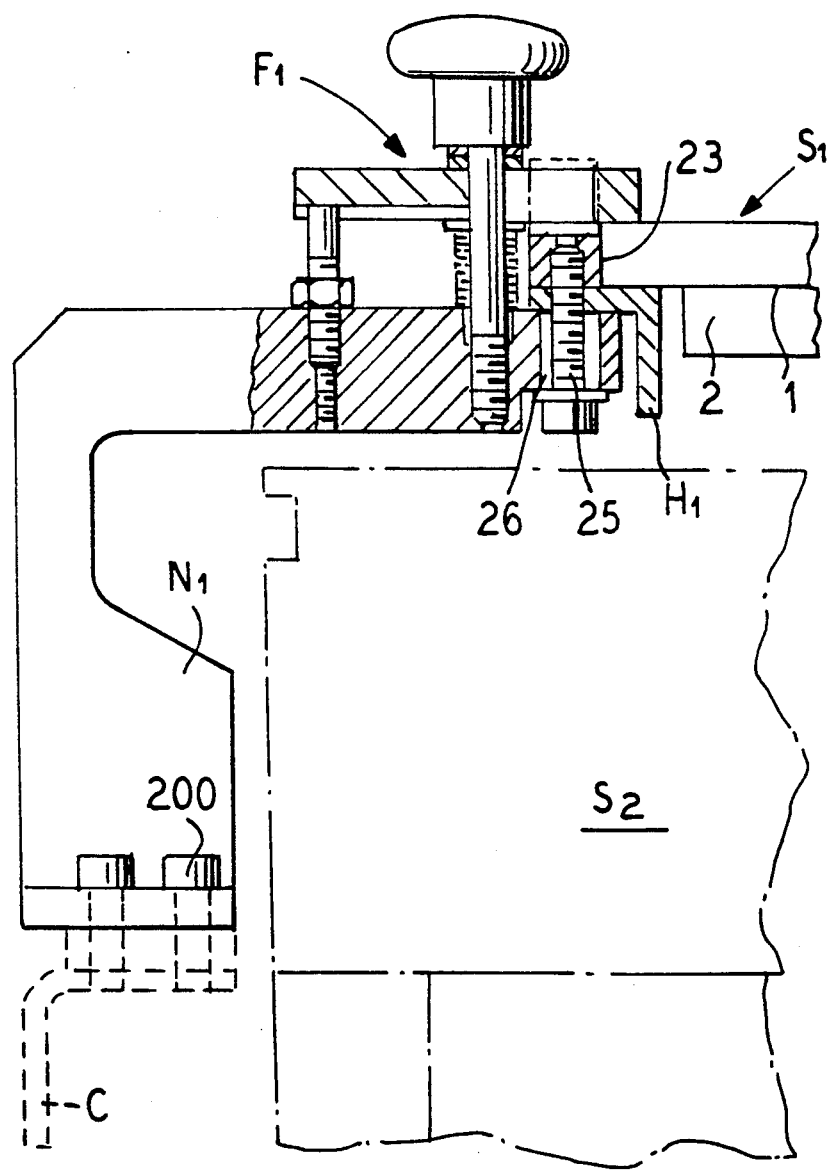
FIG. 4 is a partial end view of the table illustrated in FIG. 3 with portions broken away for purposes illustration.
Figure 5:
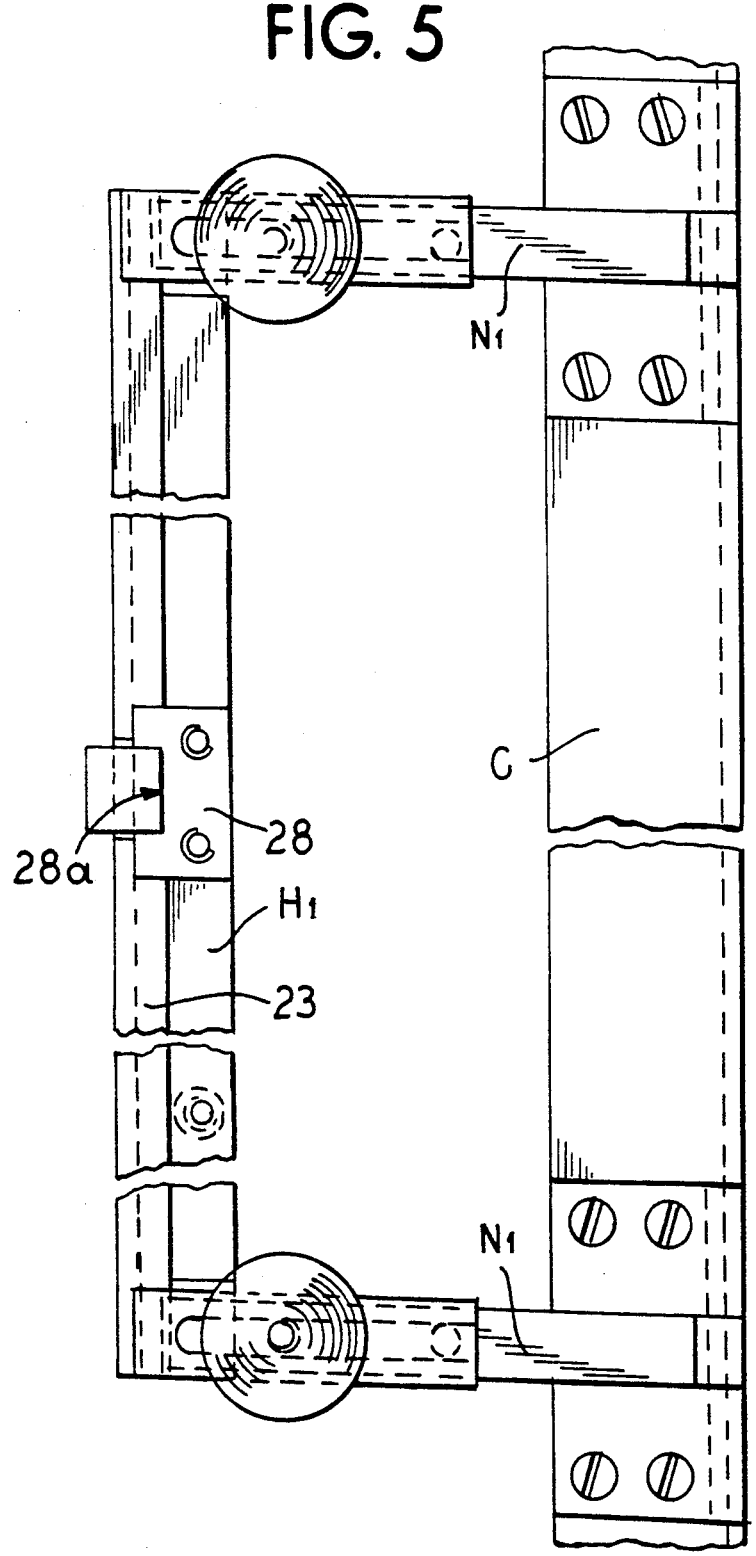
FIG. 5 is a partial top plan view of the table illustrated in FIG. 3.

As illustrated in FIG. 4, the vertical stay such as N1 has a locking means F1. In a similar manner, the stay N2 has a locking means F2. The base of the stay N1 is mounted by means of screws 200 to the frame C. The stay N1 has on its upper end a horizontal extension on which a bar H1 as well as a second bar 23 are mounted in an adjustable manner by means of a screw 25 in an oblong hole 26. The corresponding edge of the tool S1 being in contact with an edge or surface of the bar 23. A screw device F1 for manually fastening allows a definite lock of the tool S1 against the two bars H1 and 23. As illustrated in FIG. 5, the middle of the bar H1 is provided with a plate 28 having a notch 28A designed to engage with a centering plate provide a tool S1. This ensures a proper adjustment in position of the tool S1 in a direction extending parallel to the bar such as H1.

Figure 6:
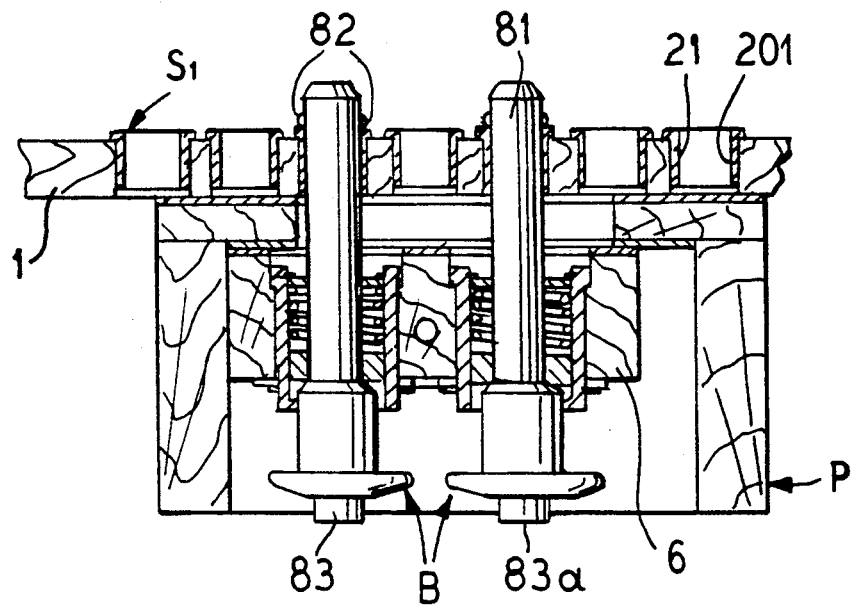
FIG. 6 is a partial cross sectional view of one embodiment of an upper tool which can be assembled utilizing the table of the present invention.

As mentioned above, when mounting the punches on the upper tool such as S1 or S'1, the openings in the grid of the lower tool S2 or S'2 are used for guiding and for positioning of the punches such as P. One example of an upper tool S1, which is formed by wooden plate which has a plurality of holes 201 provided with bushings 21 which are arranged in rows and columns over the entire area of the plate 1, is illustrated in FIG. 6. On a lower side of the plate, punches such as P are formed of a rectangular wooden member having a lid portion with an aperture. To mount this punch on the plate 1, a locking block 6 which has two self locking pins B is provided. Each of the self locking pins includes an outer hollow shaft 81 which receives an inner central rod 83. The rod 83 holds balls 82 in a locking position so as to lock the pins in the particular bushing 21. By pressing on the exposed end 83a of the rod 83, the balls 82 can move to a retracted position to allow removal of the pin from the bushing 21.

Figure 7:
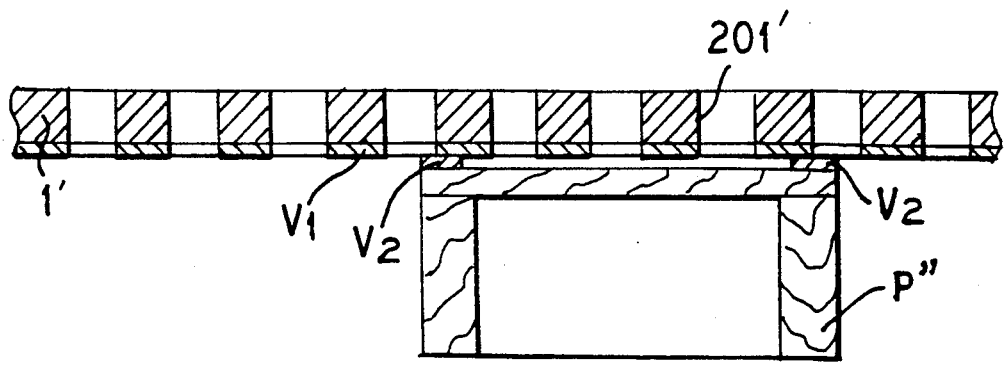
FIG. 7 is a partial cross sectional view of another embodiment of an upper tool that can be assembled by utilizing the table of the present invention.

A second embodiment for the upper tool is illustrated in FIG. 7. Here the hollow rectangular punches P'' are mounted on the plate 1' by means of two fastening layers V1 and V2. The layers V1 are applied nearly on the whole lower surface of the plate 1' except at the location of the openings, such as 201'. The layers V2 are at least placed on an upper side of the punch P''. This enables securing the punch P'' in any desired position on the plate 1'. The two fastening layers V1 and V2 are of fastening material which is well known and an example is sold under the trademark "VELCRO". Thus, the layer V1 is one of either a first and second layers of a "Velcro fastening system" which includes a first layer of loop-like material which is engageable by a second layer of hook like material to form the fastening of the first and second layers together.

It is easy to understand that the two ways of realizing the quick fixture with pins B or the Velcro fastening system having layers V1 and V2 are particularly adapted to cases where use is made of the above described table for the preparation of tools. In fact, these fastening means do not hinder the insertion of the punches P or P' through the apertures of the lower tool S2 or S'2. Moreover the hole positioning of the punches P and P' can be effected from one side of the tool S1 and S'1 which means that it is not necessarily to simultaneously have access to the other side for locking the punches in place. As in the case with the upper tool as described in the above mentioned U.S. patent. The fixture with the pin B or the Velcro fastening system allows the preparation of the upper tool S1 even if the table is in a vertical position as seen in FIG. 1.

Although various minor modifications may be suggested by those versed in the art, it should be understood that I wish to embody within the scope of the patent granted hereon all such modifications as reasonably and properly within the scope of my contribution to the art.

I claim as my invention:

1. A method of using a table having a first assembly of supports for a first pair of tools and a second assembly of supports for a second pair of tools being arranged one with regard to the other in a way similar to the disposition of the tools in a machine, said table being pivotable on a horizontal axis between a first position in which at least the lower tool can be transferred horizontally from the table to the machine and from the machine to the table, and a second position in which the operator is able to insert punches through openings in the lower tool on to the upper tool for securing thereon, said method including the steps of positioning the lower tool in said table while the table is in the first position and turning the table with the lower tool on said horizontal axis to said second position, positioning a punch by locating it in an aperture in said lower tool and then positioning it on a surface of the upper tool and actuating means for a quick fastening of the punch to said upper tool.

2. A method according to claim 1, wherein the step of actuating the means for quick fastening include inserting self locking pins forming the means for quick fastening through openings in said upper tool and actuating said self locking pins to secure the punch thereon.

3. A method according to claim 1, wherein the step of actuating the means for quick fastening includes engaging fastening strips disposed on the punch on the fastening strips disposed on a surface of the upper tool so that the engaging hooks of one of said fastening strips are received in the loops of the other.

* * * * *